(12) United States Patent
Davies et al.

(10) Patent No.: US 6,400,366 B1
(45) Date of Patent: Jun. 4, 2002

(54) METHOD AND SYSTEM FOR THE INTERACTIVE VISUALIZATION AND EXAMINATION OF DATA

(75) Inventors: Paul T. Davies, Seattle, WA (US); Sandra L. Loop, Toronto (CA)

(73) Assignee: Visual Insights, Inc., Naperville, IL (US)

( * ) Notice: Subject to any disclaimer, the term of this patent is extended or adjusted under 35 U.S.C. 154(b) by 0 days.

(21) Appl. No.: 09/152,485

(22) Filed: Sep. 14, 1998

(51) Int. Cl.[7] .............................................. G06T 15/00
(52) U.S. Cl. ...................................................... 345/440
(58) Field of Search ................................ 345/418, 419, 345/422, 423, 440, 660, 663, 665, 440.1, 440.2

(56) References Cited

U.S. PATENT DOCUMENTS

| | | | | |
|---|---|---|---|---|
| 5,929,863 A | * | 7/1999 | Tabei et al. ................. | 345/440 |
| 5,953,017 A | * | 9/1999 | Beach et al. ................. | 345/440 |
| 5,966,139 A | * | 10/1999 | Anupam et al. ............ | 345/440 |
| 5,986,673 A | * | 11/1999 | Martz ......................... | 345/440 |
| 6,081,267 A | * | 6/2000 | Stockham et al. .......... | 345/334 |

* cited by examiner

Primary Examiner—Phu K. Nguyen
(74) Attorney, Agent, or Firm—Oliff & Berridge, PLC

(57) ABSTRACT

A method and system for the interactive visualization and examination of data displays a set of data with graphics primitives, corresponding to attributes of the data set, in a rendered visualization. The set of data is arranged in the rendering with data items grouped in a set of ranges of data values, referred to as buckets. A user can interactively select a sub-set of the set of data and the visualization is re-rendered with the ranges of data values re-sized to display the selected sub-set with finer granularity.

44 Claims, 8 Drawing Sheets

METHOD AND SYSTEM FOR THE INTERACTIVE VISUALIZATION AND EXAMINATION OF DATA

FIELD OF THE INVENTION

The present invention relates to a method and system for the interactive visualization and examination of data. More specifically, the present invention relates to a method and system for visualizing and interactively selecting, arranging and examining data displayed in a 3D graphical representation, wherein the data can be complex and/or dense.

BACKGROUND OF THE INVENTION

Systems employing 3D graphic primitives to represent information are well known and have been employed in a variety of visualization systems. For example, scientific visualization systems have been employed for critical data analysis needs such as weapons design, turbine and fluid flow designs and seismographic exploration.

One of the advantages provided by such systems is that, due to the significant visual information processing capabilities of the human brain, it is generally easier for an individual to absorb and/or understand data represented visually than data represented in numerical or textual form. Further, complex and/or dense data which, if in a numerical or textual format would require multiple sheets of paper to be printed out or multiple screens of a computer monitor to be displayed can be represented on a single computer monitor screen in a well designed visualization.

Generally, early information visualization systems were too expensive for widespread use but recent increases in available microprocessor processing power, and a simultaneous decrease in the prices of microprocessor-based computer systems, have made such systems available to a wider audience, who can have varying degrees of sophistication. Such systems allow users to represent and examine complex and/or dense data in a 3D graphic environment displayed on the monitor of a personal computer. For example, published international patent application PCT/CA94/00609, assigned to the assignee of the present invention, teaches a system for displaying data with the 3D graphics primitives in a rendered 3D environment. The environment and the arrangement of graphics primitives is referred to in the application as a 3D data landscape, or visualization, and such data landscape systems have now been emulated in systems produced by a variety of companies.

As the data represented by visualization systems is often complex and/or dense, it is often organized in a hierarchy and arrangement selected by the visualization designer. The designer decides how information is to be displayed within the visualization, and tradeoffs are typically required in terms of the hierarchy employed and the form of the display. Despite the advantages provided by such 3D information visualization systems, problems still exist in that it can be difficult for a user to locate, select, regroup and display subsets of information from within the visualization.

It is therefore desired to provide a method and system to allow the user to interactively select, examine and regroup information displayed in an information visualization system.

SUMMARY OF THE INVENTION

It is an object of the present invention to provide a novel method and system for the interactive visualization and examination of data.

According to a first aspect of the present invention, there is provided an interactive visualization system comprising:

data access means;

processor means receiving data from said data access means and creating a rendered visualization representative of said data;

display means to display said rendered visualization to a user; and user input means to receive input from said user to select a subset of said data represented by said visualization and to cause said processor to re-render said selected subset of said data in greater detail on said display.

Preferably, the data is arranged within a defined set of data value ranges on each axis of the visualization and the user selects a sub-set of data by selecting at least one range and the processor re-renders the visualization with the data in the selected range arranged in a new set of data value ranges of finer granularity.

According to another aspect of the present invention, there is provided a method of interactively visualizing and examining data, comprising the steps of:

(i) providing a set of data to be visualized;

(ii) defining a visualization model including at least one graphics primitive defined to be associated with a parameter of said set of data;

(iii) rendering a visualization of said set of data according to said visualization model;

(iv) receiving input from a user representing the selection of a sub-set of said set of data;

(v) re-rendering said visualization such that said selected sub-set is displayed in finer granularity;

(vi) repeating steps (iv) and (v) as desired.

The present invention provides a method and system for the interactive visualization and examination of data displays a set of data with graphics primitives, corresponding to attributes of the data set, in a rendered visualization. The set of data is arranged in the rendering with data items grouped in a set of ranges of data values, referred to as buckets. A user can interactively select a sub-set of the set of data and the visualization is re-rendered with the ranges of data values re-sized to display the selected sub-set with finer granularity.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
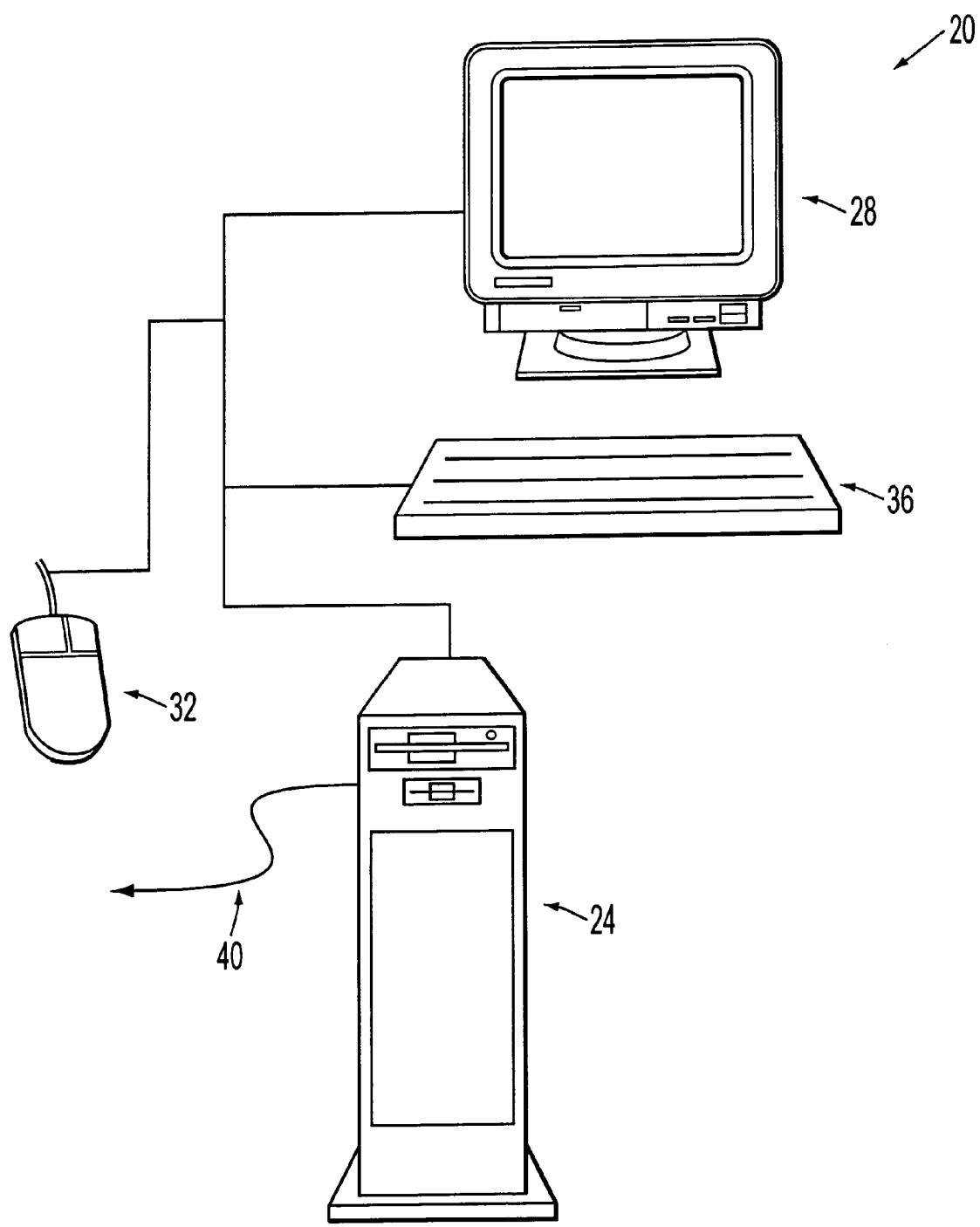
FIG. 1 shows an information visualization system.

FIG. 1 shows an information visualization system 20. System 20 includes a computer processor unit 24 which can be a general purpose computer system, such as a personal computer or a special purpose computer system, a computer monitor 28 and one or more user input means, such as mouse 32 and keyboard 36. Preferably processor unit 24 is a high performance computer system, having a high speed processor such as an Intel Pentium II processor operating at a clock speed of at least 266 MHz. Processor unit 24 also includes a video card, not shown, preferably with hardware-accelerated graphics and supporting the OpenGL standard, to drive monitor 28. Processor unit 24 can include local storage devices, such as a Winchester type disk drive (not shown) and/or a CD or DVD ROM drive (not shown). Further, processor unit 24 can be connected to a network via a suitable communication link 40, to access and store information and/or to communicate with other computer systems.

Preferably, monitor 28 is a high resolution color monitor, capable of displaying resolutions of at least 1024×768 pixels, although lower resolution monitors and non-color display monitors can be employed in some applications. Also, while only mouse 32 and keyboard 36 are illustrated as user-input means, any other suitable input means as would occur to those of skill in the art can be employed, including graphics tablets, trackballs, etc.

Processor unit 24 executes an appropriate information visualization program, such as the SeeIT™ program, produced by the assignee of the present invention, to process data and create an information visualization on monitor 28. The data to be processed can be input with the user input means, or can be read from a storage source in processor unit 24 or via communications link 40. Once a visualization is created, the user can interact with the visualization via the input means, as discussed below.

Figure 2:
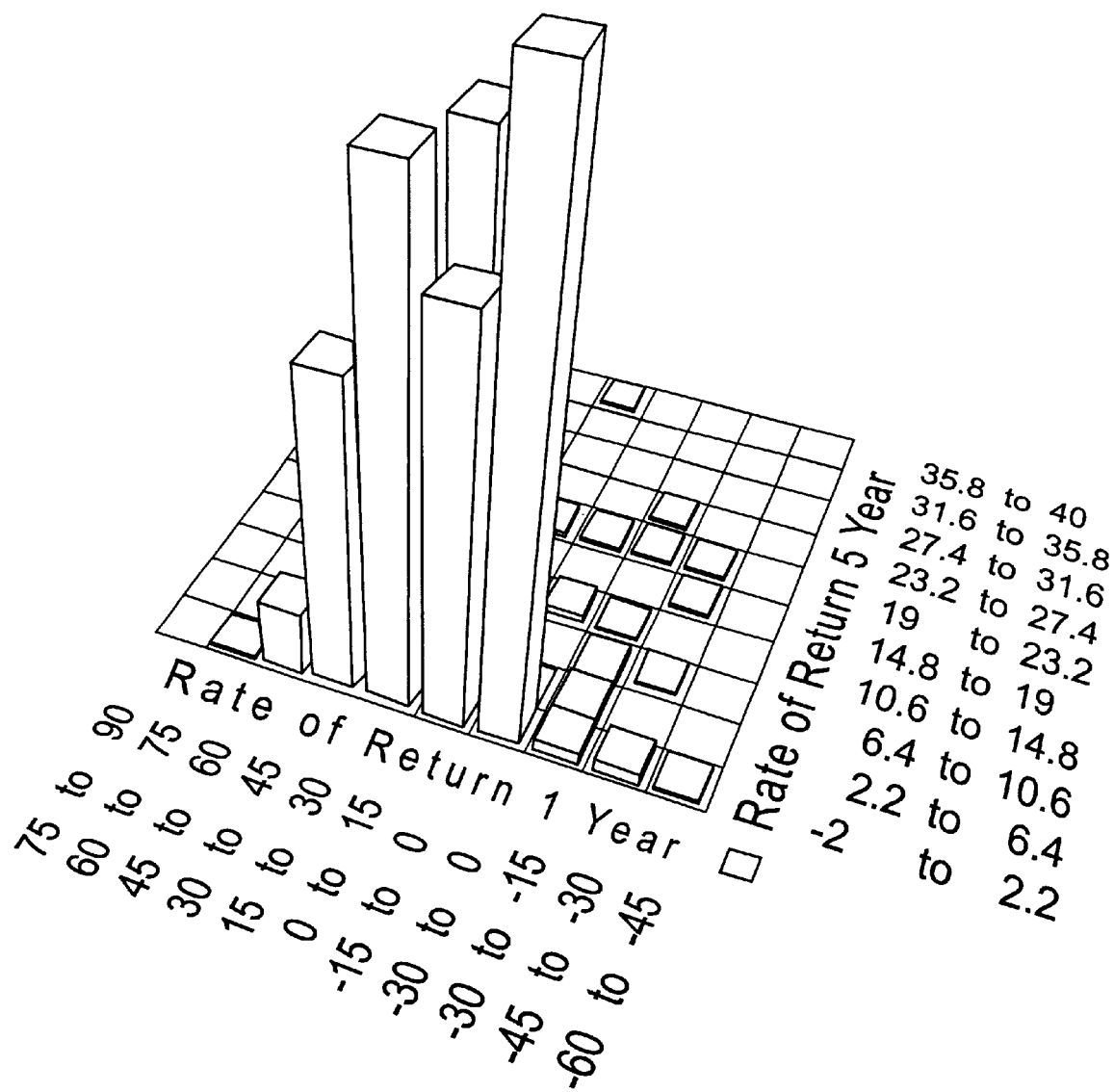
FIG. 2 shows an example of a rendered information visualization.

FIG. 2 shows an example of a data visualization which can be created and displayed with system 20 of FIG. 1 in accordance with the present invention. This visualization represents the performance of over nine hundred mutual funds and includes a grid where the X-axis represents the five year performance of these funds, organized into a set of ranges, and the Y-axis represents the one year performance of these funds, organized into another set of ranges. This example of a visualization will be further discussed below in more detail.

Figure 3:
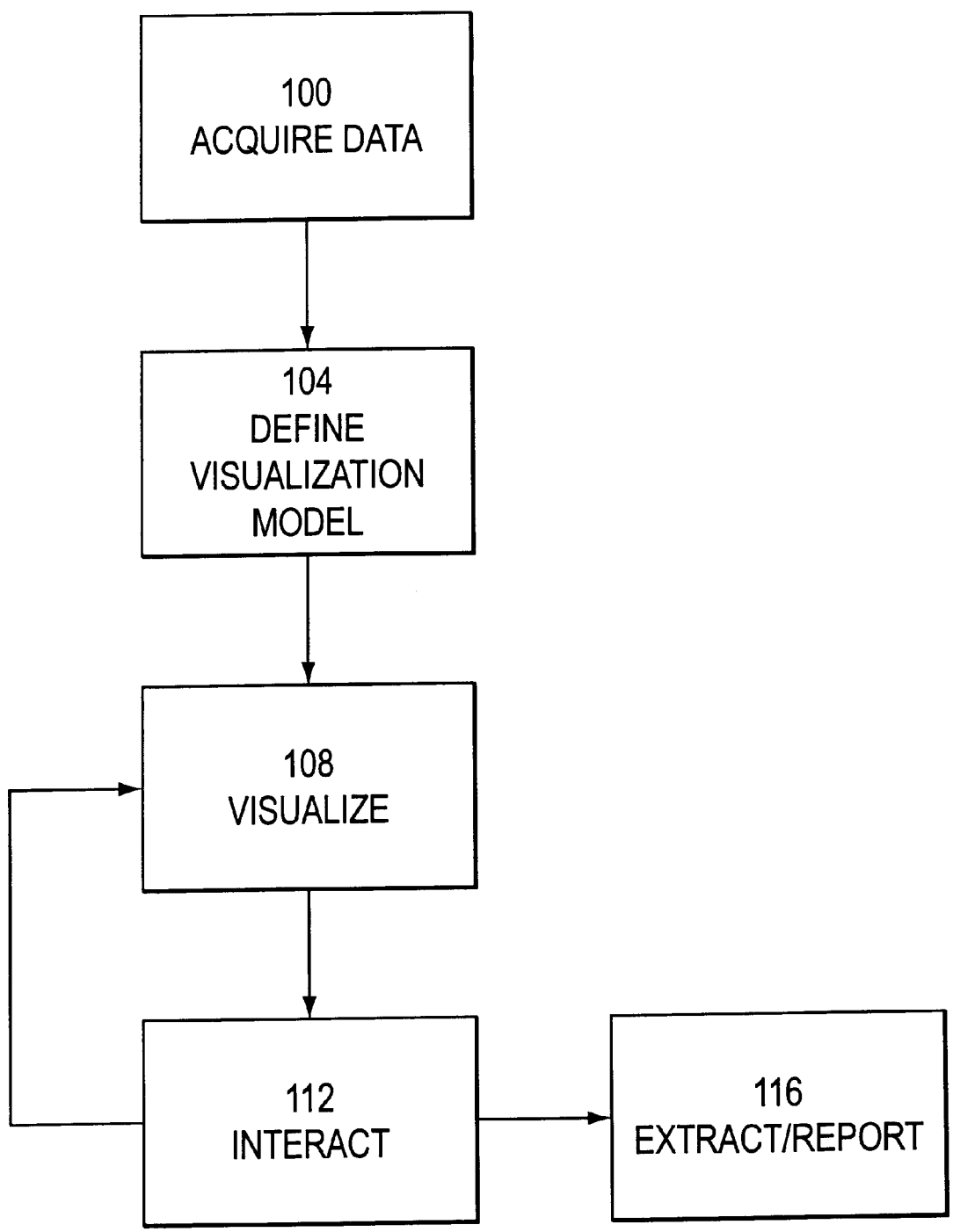
FIG. 3 shows a flowchart of a visualization production and examination process.

FIG. 3 shows the process of constructing and using an information visualization. The process commences at step 100, wherein data to be visualized is provided to system 20. Specifically, the data can be: input via one or more of the user input means; imported from another application; accessed via communications link 40; accessed from a file on a mass storage device in unit 24; etc. Preferably, such data is formatted into data tables with, for example, table rows comprising data items and table columns comprising data attributes for the items. It is contemplated that such data can be provided to system 20 in such tables, or the data can be converted to such tables by system 20 as part of the data provision process. In any event, the data should be formatted in an arrangement wherein each data record has a like format.

Figure 4A:
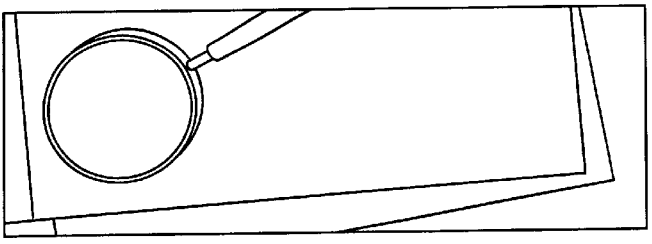
FIG. 4a shows a dialog box from an embodiment of the present invention which is employed to acquire data for a visualization.

For example, for the mutual fund visualization of FIG. 2, the data can be provided in a table wherein each row of the table represents a different mutual fund and the columns represent a rate of return over different periods and other information of interest associated with each mutual fund. FIG. 4a shows a dialog box from a present embodiment of the invention showing one method of providing the data for the visualization of FIG. 2 to system 20 and the method of converting that data into the desired tabular format.

Once the data to be visualized is available to system 20, the data is transformed and the visualization model created by the user at step 104. Specifically, during the transformation step, the user can define the type of visualization, the data items assigned to the axes and the graphics primitives and/or attributes applied to the data. The user can also apply mathematical and/or statistical operations to the data to obtain additional, derived, information as desired. For example, min, max, sum, standard deviation, averages and other functions can be employed to effectively add additional columns to the data tables.

Figure 4B:
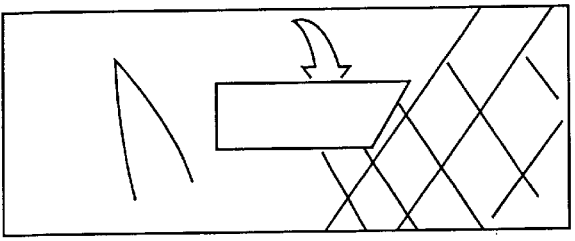
FIG. 4b shows a dialog box from an embodiment of the present invention which is employed to define a visualization model.

FIG. 4b shows a dialog box from a present embodiment of the invention wherein the grid plot example of FIG. 2 is being defined. In this example, the one year rate of return has been associated with the Y-axis, the five year rate of return has been associated with the X-axis, the height of the columns has been associated with the number of mutual funds at each grid intersection, via a "count" operator, and the color of the columns has been associated with the sum of the assets managed by the funds at each grid intersection, via a "sum" operator.

The numerical values for height, width and depth in the dialog box indicate the desired relative scale for the columns, i.e.—they interrelate the default dimensions of the columns. The height of each column will vary, according to its related data (count of the funds represented by the column). The numerical values for color represent normalized red, green and blue components of the default color of the columns, the color of each column changing from the default color according to the sum of the assets of the funds represented by the column.

While the dialog boxes of FIGS. 4a and 4b are employed in a present embodiment of the invention, the method of providing the data, defining the visualization model and assigning the graphics primitives and/or attributes is not particularly limited, and any suitable method, as would occur to those of skill in the art, can be employed.

In a present embodiment of the invention, data to be visualized is grouped into structures, referred to by the present inventors as "buckets", for each axis of the visualization. In the grid plot example of FIG. 2, each axis has a maximum of ten buckets, for a total of one hundred grid intersections, and system 20 automatically defines the bucket ranges and organizes the data within these buckets appropriately. Each bucket will contain the mutual funds whose values fall within the corresponding range and, in this example, the height of the columns represents the number of funds at the intersection of the respective buckets.

As shown in FIG. 2, the ten buckets of the Y-axis, which is labeled "Rate of Return 1 Year", have ranges: −60 to −45; −45 to −30; −30 to −15; −15 to 0; 0 to 15; 15 to 30; 30 to 45; 45 to 60; 60 to 75; and 75 to 90. The ten buckets of the X-axis, which is labeled "Rate of Return 5 Year", have ranges: −2 to 2.2; 2.2 to 6.4; 6.4 to 10.6; 10.6 to 14.8; 14.8 to 19; 19 to 23.2; 23.2 to 27.4; 27.4 to 31.6; 31.6 to 35.8 and 35.8 to 40. By default, the bucket ranges for each axis are defined by dividing the absolute range of values in the data set for the corresponding axis into equal size ranges (i.e.—−60 to +90 for the 1-Year axis gives an absolute range of 150, which results each bucket's range being 15), although ranges and the number of buckets can be modified by the users as described below.

As presently implemented, the bucket structures are collections of pointers to entries in the data tables that meet the criteria for the bucket. For example a bucket with a data range of 0 to 10 will have a pointer to each row in the data table whose data of interest (e.g.—one year rate of return) is within the data range of the bucket. The grid-type visualization of FIG. 2 is formed by determining the common pointers at each intersection of buckets in the grid. As data changes or bucket ranges are redefined, as described below, the bucket structures are updated to contain pointers to the corresponding data table entries.

Once the data has been provided and the visualization model defined, the visualization can be rendered at step 108 to achieve an initial visualization, such as that shown in FIG. 2 and users can re-orient, re-size and otherwise navigate their viewpoint with respect to the visualization, as desired.

In another embodiment of the present invention, system 20 initially defines the bucket ranges such that a zero value is always on a boundary between buckets. For example, in FIG. 2, the X-axis ranges can be defined as −5 to 0; 0 to 5; 5 to 10; 10 to 15; 15 to 20; 20 to 25; 25 to 30; 30 to 35; 35 to 40; and 40 to 45. It is believed that, for some users, arranging the ranges of the buckets such that a zero value is present on a boundary enables a quicker comprehension of the visualization by the user. Once the initial display has been presented to the user with the zero-boundary arrangement, subsequent updates to the visualization, by user interaction (as described below), need not ensure such an arrangement.

While it is contemplated that the initial definition, by system 20, of bucket ranges to ensure that a zero value is always on a boundary will be preferred by some users, it is contemplated that this feature may not be preferred by all users and this feature can therefore be provided as a user-selectable option, selectable from an appropriate dialog box or through any other suitable means as will occur to those of skill in the art.

As the visualization is examined and explored by a user, the user may wish to interact with the visualization at step 112 to alter it. For example, the user can explicitly add or remove buckets from the visualization. By adding buckets, the visualization acquires a finer granularity, having smaller ranges of data represented by each graphics primitive (in this example the columns) and this allows detailed examination of information by the user. By removing buckets, the visualization acquires a coarser granularity, having larger ranges of data represented by each graphics primitive, allowing a user to identify overall trends and/or regions of interest more easily.

Figure 5:
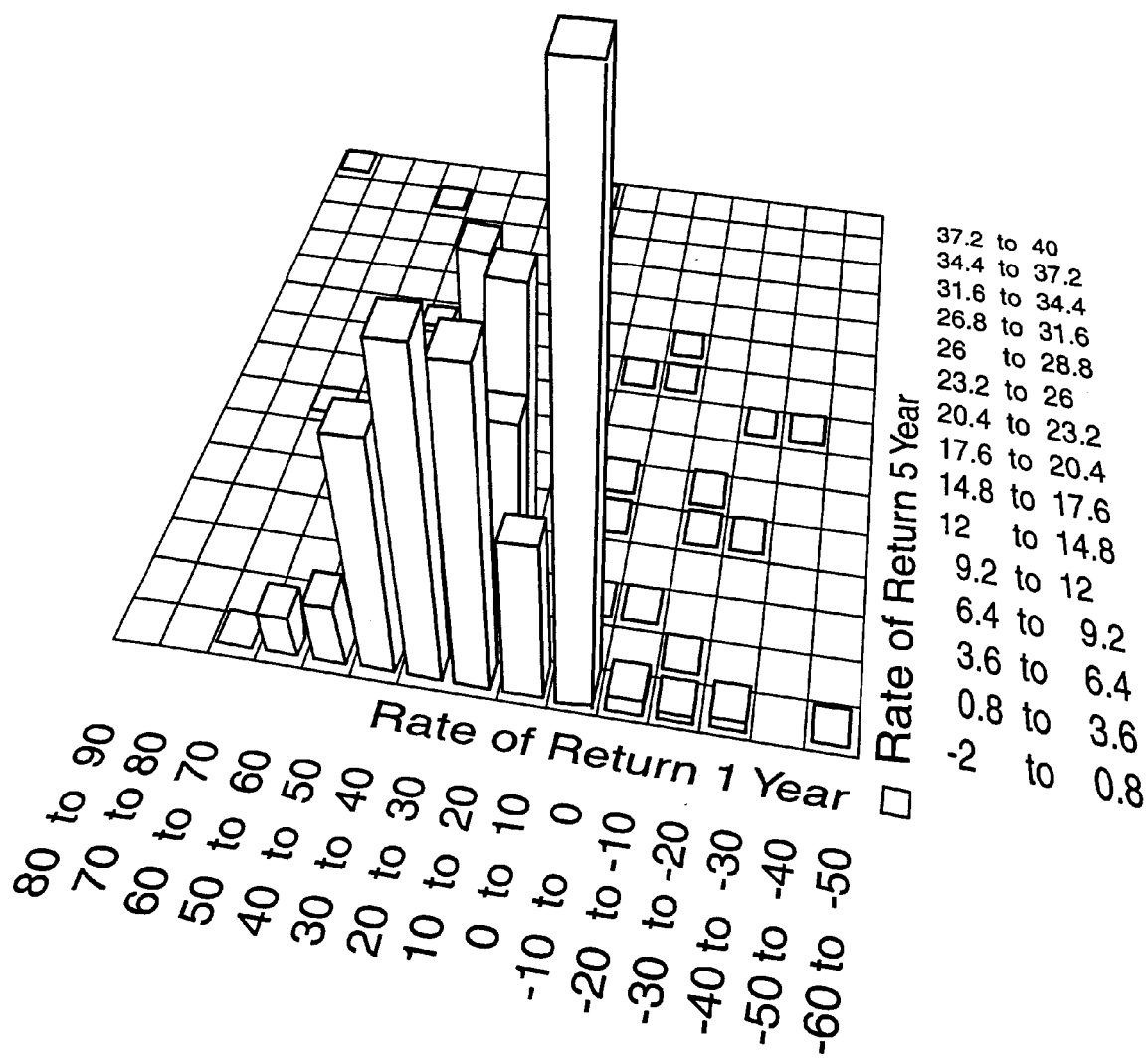
FIG. 5 shows the rendered information visualization of FIG. 2, wherein the number of buckets on each axis has been increased.

The explicit alteration of the number of buckets can be performed in a variety of manners, such as via a suitable dialog box wherein the desired number of Y-axis and X-axis buckets is input by the user. FIG. 5 shows the visualization of FIG. 2 after the user has specified fifteen buckets for each of the X and Y axes. As can be seen, the visualization has been re-rendered and provides a visualization with finer granularity.

Figure 6:
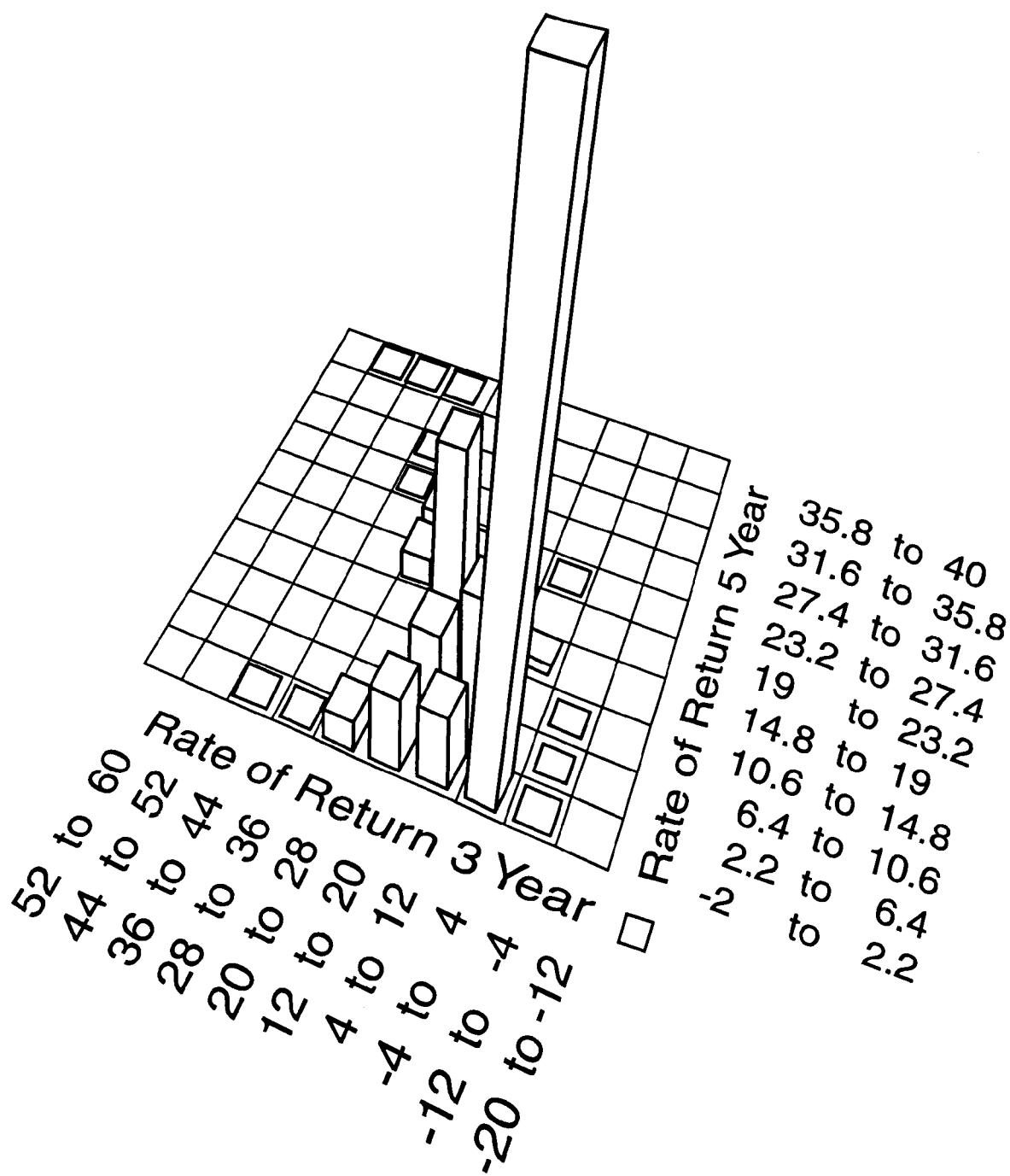
FIG. 6 shows the rendered information visualization of FIG. 2, wherein the data represented by one axis has been changed.

Also, the user can change the data associated with one or both of the X and Y axes, as shown in FIG. 6 wherein the Y-axis has now been associated with the three year rate of return. Such a change can be accomplished via a suitable dialog box, or via any other suitable means as would be apparent to those of skill in the art.

A feature of the present invention which is believed to be of particular advantage is the ability of a user to interactively "zoom" to a selected subset of information for re-rendering with finer granularity. Specifically, a user can select a range on an axis, or on both axes, by selecting a bucket, or a contiguous range of buckets, with a user input means such as a mouse, and then have system 20 perform a zoom function and re-render the visualization.

When the zoom function is performed, the buckets for each respective axis of the visualization are redefined such that, if one or a range of buckets have been selected on an axis, all the non-selected buckets on the axis above those selected are "collapsed" into a single bucket and all the non-selected buckets on the axis below those selected are collapsed into a single bucket. The data range represented by the selected bucket or buckets is then expanded into a resized set of the remaining number of buckets which each have a data range representing substantially equally portions of the selected data range. The visualization is then re-rendered by system 20 with the data placed into the appropriate buckets.

Figure 7:
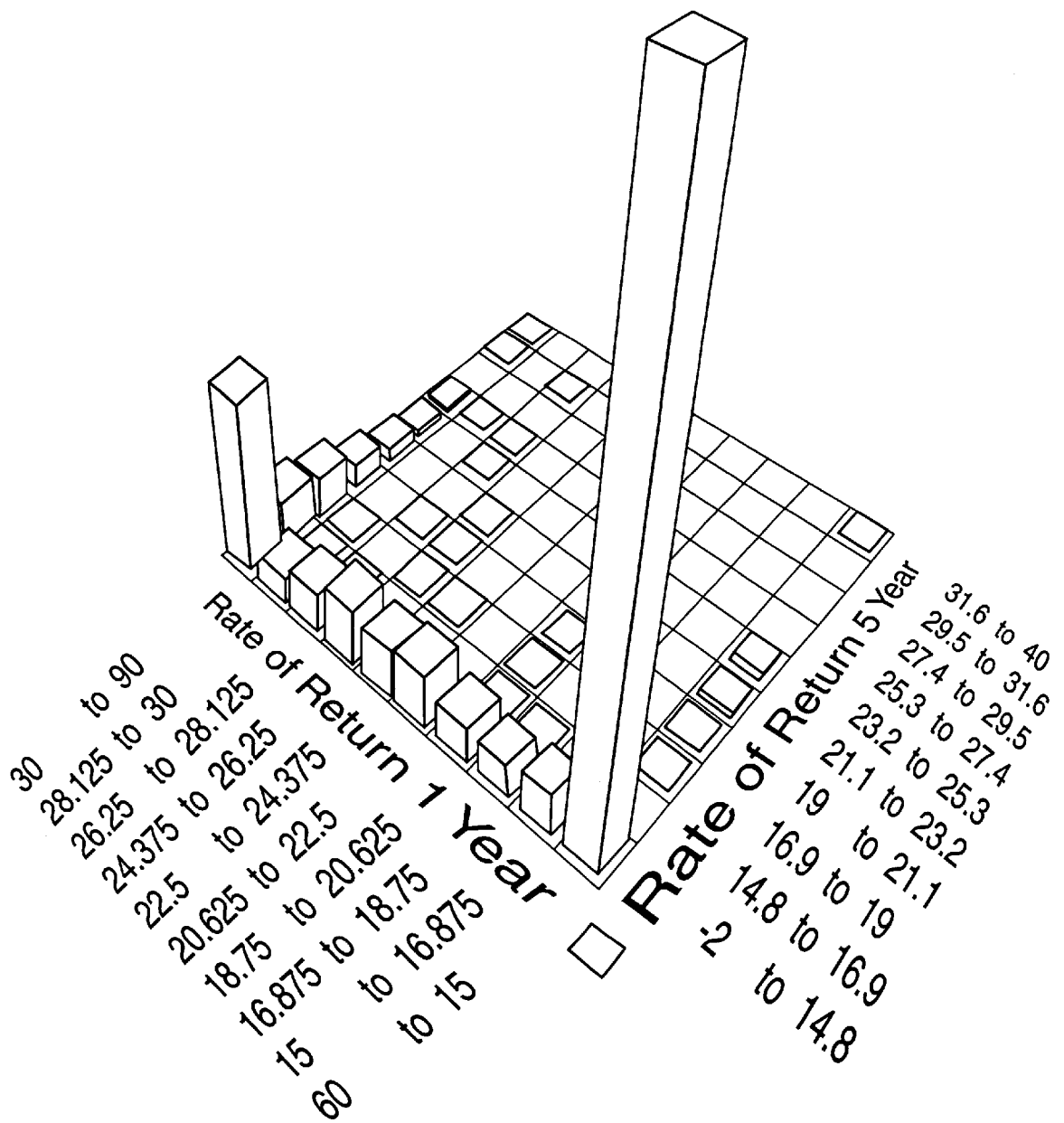
FIG. 7 shows the rendered visualization of FIG. 2 wherein a zoom operation has been performed.

For example, in the visualization of FIG. 2, the user can, on the X-axis, select the buckets for the ranges from the range 14.8 to 19 to the range 27.4 to 31.6 to define a range of interest of 14.8 to 31.6 and on the Y-axis select the bucket for the range 15 to 30. The user can then instruct system 20 to perform a zoom and the visualization will be rerendered, as shown in FIG. 7. As will be apparent, on the Y-axis the data values below 15 have been grouped into a single bucket (representing −60 to +15), the data values above 30 have been grouped into a single bucket (representing 30 to 90) and the selected range of 15 to 30 has been expanded to eight buckets, each having a range of 1.875 (i.e.—15 to 16.875, etc.). On the X-axis, a similar result has been obtained with the data values below 14.8 being grouped into one bucket, the data values above 31.6 being grouped into another bucket and the selected data range being expanded into the remaining eight buckets.

The zoom process can be re-performed, as desired, to obtain finer granularity in the visualization of the information of interest. In this manner, a user can drill down into the visualized data as desired. Further, at any point, the user can reset to visualization to reset the buckets to reflect equal data ranges of the entire data set and/or can perform zooms on other areas of interest in the visualization.

The method of selecting data ranges of interest is not particularly limited and can be achieved in a variety of manners, as will occur to those of skill in the art, including clicking on the data range labels in the visualization with a mouse or by keyboard input into a suitable dialog box. Further, the method of instructing system 20 to perform a zoom operation on selected data ranges can be achieved in a variety of manners, as will occur to those of skill in the art, including selecting an icon from a toolbar and activating a predefined key sequence on a keyboard.

At any point in any iteration of step 112 the user can extract from the rendered visualization desired data and/or produce a report at step 116. Specifically, data can be extracted in a graphical representation, by printing or capturing a view of the visualization, or data can be extracted in numerical and/or textual form from the data tables represented by the visualization. For example, if the user selects one or more columns from the visualization, the underlying corresponding rows and columns of the data tables are also selected and can be printed or otherwise output as desired.

The present invention provides a novel system and method for the interactive visualization and examination of data. The arrangement of data items into ranges defined by buckets and the ability of a user to zoom into selected ranges of data in those buckets, provide powerful, yet intuitive data analysis capabilities to users.

The above-described embodiments of the invention are intended to be examples of the present invention and alterations and modifications may be effected thereto, by those of skill in the art, without departing from the scope of the invention which is defined solely by the claims appended hereto.

We claim:

1. An interactive visualization system comprising:

data access mean;

processor means receiving data from said data access means and creating a rendered visualization representative of said data, the rendered visualization comprising at least a first attribute of the data arranged relative to a first axis of the rendered visualization according to a first set of groupings;

display means to display said rendered visualization to a user; and user input means to receive input from said user to select a subset of said data represented by said visualization and to cause said processor to re-render said selected subset of said data on said display such that at least the first attribute of the data is arranged relative to the first axis of the rendered visualization according to a second set of groupings, the second set of groupings arranged to visualize the selected subset in greater detail than in the first set of groupings.

2. A visualization system according to claim 1 wherein said data access means comprises a storage device.

3. A visualization system according to claim 1 wherein said data access comprises a data communication link and wherein said data is provided from a communications network through said link.

4. A visualization system according to claim 1 wherein, within said rendered visualization, said data is arranged within a defined set of data value ranges on each axis of said visualization.

5. A visualization system according to claim 4 wherein said user selects said sub-set of data by selecting at least one range of said defined set of data value ranges with said user input means and said processor re-renders said visualization with said data in said selected at least one range arranged in a new set of data value ranges of finer granularity.

6. A method of interactively visualizing and examining data, comprising the steps of:

(i) providing a set of data to be visualized;

(ii) defining a visualization model including at least one graphics primitive defined to be associated with a parameter of said set of data;

(iii) rendering a visualization of said set of data according to said visualization model at a first level of granularity;

(iv) receiving input from a user representing the selection of a sub-set of said set of data;

(v) re-rendering said visualization such that said selected subset is displayed at a second level of granularity that is finer than the first level of granularity;

(vi) repeating steps (iv) and (v) as desired.

7. The method of claim 6 where in step (iv) said user selects said sub-set from said visualization.

8. The method of claim 6 where in step (iii) said set of data is displayed in said rendered visualization in accordance with groups of predefined data value ranges.

9. The method of claim 8 where in step (v) said re-rendered visualization re-sizes said predefined data ranges for said selected sub-set.

10. An interactive visualization system usable to visualize data obtained from a data source, comprising:

at least one data input device usable by a user to input at least one of data and commands to the interactive visualization system;

a data processing circuit that creates a rendered visualization representative of the obtained data, the rendered visualization comprising at least a first attribute of the data arranged relative to a first axis of the rendered visualization according to a first set of groupings; and a display device usable to display the rendered visualization of the obtained data; wherein:

the at least one data input device is usable by the user to select a subset of the obtained data represented by the rendered visualization; and the data processing circuit re-renders the rendered visualization of the obtained data based on the selected subset, such that at least the first attribute of the data is arranged relative to the first axis of the rendered visualization according to a second set of groupings, the second set of groupings arranged to visualize the selected subset in greater detail than that of the first set of groupings.

11. The interactive visualization system of claim 10, further comprising a memory, the memory storing the obtained data.

12. The interactive visualization system of claim 10, wherein the data source is a storage device of the visualization system.

13. The interactive visualization system of claim 10, further comprising a data communication link, wherein:

the data source is a communications network; and the obtained data is obtained from the communications network through the data communication link.

14. The interactive visualization system of claim 10, wherein each grouping of the first set of groupings corresponds to an associated data value range of the first attribute distributed along the first axis of the rendered visualization.

15. The interactive visualization system of claim 14, wherein:

the user selects the subset of the obtained data by selecting at least one grouping of the first set of groupings using at least one of the at least one data input device;

each grouping of the second set of groupings corresponds to an associated data value range of the first attribute distributed along the first axis of the rendered visualization; and the data processing circuit re-renders the rendered visualization with the data corresponding to the selected at least one grouping arranged in the second set of groupings at a finer level of granularity.

16. The interactive visualization system of claim 10, wherein:

the rendered visualization further comprises at least a second attribute of the data arranged relative to a second axis of the rendered visualization according to a third set of groupings;

the selected subset of the obtained data represented by the rendered visualization is a subset of the obtained data distributed along each of the first and second axes; and the data processing circuit re-renders the rendered visualization of the obtained data based on the selected subset, such that at least:

the first attribute of the data is arranged relative to the first axis of the rendered visualization according to the second set of groupings, the second set of groupings arranged to visualize the selected subset in greater detail than in the first set of groupings, and the second attribute of the data is arranged relative to the second axis of the rendered visualization according to a fourth set of groupings, the fourth set of groupings arranged to visualize the selected subset in greater detail than in the third set of groupings.

17. The interactive visualization system of claim 16, wherein:

each grouping of the first set of groupings corresponds to an associated data value range of the first attribute distributed along the first axis of the rendered visualization; and each grouping of the third set of groupings corresponds to an associated data value range of the second attribute distributed along the second axis of the rendered visualization.

18. The interactive visualization system of claim 17, wherein:

the user selects the subset of the obtained data by selecting at least one grouping of the first set of groupings and at least one grouping of the third set of groupings using at least one of the at least one data input device;

each grouping of the second set of groupings corresponds to an associated data value range of the first attribute distributed along the first axis of the rendered visualization;

each grouping of the fourth set of groupings corresponds to an associated data value range of the second attribute distributed along the second axis of the rendered visualization; and the data processing circuit re-renders the rendered visualization with the data corresponding to the selected at least one grouping of the first set of groupings arranged in the second set of groupings at a finer level of granularity and the data corresponding to the selected at least one grouping of the third set of groupings arranged in the fourth set of groupings at a finer level of granularity.

19. An interactive visualization system usable to visualize data obtained from a data source, comprising:

at least one data input device usable by a user to input at least one of data and commands to the interactive visualization system;

a data processing circuit that creates a rendered visualization representative of the obtained data, the rendered visualization comprising at least a first attribute of the data arranged relative to a first axis of the rendered visualization at a first level of granularity; and a display device usable to display the rendered visualization of the obtained data; wherein:

the at least one data input device is usable by the user to select a subset of the obtained data represented by the rendered visualization; and the data processing circuit re-renders the rendered visualization of the obtained data based on the selected subset of the obtained data to visualize the selected subset of the obtained data in greater detail, such that at least the selected subset of the data is arranged relative to the first axis of the rendered visualization at a second level of granularity, the second level of granularity visualizing the selected subset in greater detail than the first level of granularity.

20. The interactive visualization system of claim 19, further comprising a memory, the memory storing the obtained data.

21. The interactive visualization system of claim 19, wherein the data source is a storage device of the visualization system.

22. The interactive visualization system of claim 19, further comprising a data communication link, wherein:

the data source is a communications network; and the obtained data is obtained from the communications network through the data communication link.

23. The interactive visualization system of claim 19, wherein the first level of granularity corresponds to a first set of data value ranges of the first attribute distributed along the first axis of the rendered visualization.

24. The interactive visualization system of claim 23, wherein:

the user selects the subset of the obtained data by selecting at least one data value range of the first set of data value ranges using at least one of the at least one data input device;

the second level of granularity corresponds to a second set of data value ranges of the first attribute distributed along the first axis of the rendered visualization; and the data processing circuit re-renders the rendered visualization with the data corresponding to the selected at least one data value range of the first set of data value ranges arranged in the second set of data value ranges.

25. The interactive visualization system of claim 19, wherein:

the rendered visualization further comprises at least a second attribute of the data arranged relative to a second axis of the rendered visualization according to a third level of granularity;

the selected subset of the obtained data represented by the rendered visualization is a subset of the obtained data distributed along each of the first and second axes; and the data processing circuit re-renders the rendered visualization of the obtained data based on the selected subset, such that at least:

the selected subset of the data is arranged relative to the first axis of the rendered visualization at the second level of granularity, the second level of granularity visualizing the selected subset distributed along the first axis in greater detail than the first level of granularity, and the selected subset of the data is arranged relative to the second axis of the rendered visualization at a fourth level of granularity, the fourth level of granularity visualizing the selected subset distributed along the second axis in greater detail than the third level of granularity.

26. The interactive visualization system of claim 25, wherein:

the first level of granularity corresponds to a first set of data value ranges of the first attribute distributed along the first axis of the rendered visualization; and the third level of granularity corresponds to a third set of data value ranges of the second attribute distributed along the second axis of the rendered visualization.

27. The interactive visualization system of claim 26, wherein:

the user selects the subset of the obtained data by selecting at least one data value range of the first set of data value ranges and at least one data value range of the third set of data value ranges using at least one of the at least one data input device;

the second level of granularity corresponds to a second set of data value ranges of the first attribute distributed along the first axis of the rendered visualization;

the fourth level of granularity corresponds to a fourth set of data value ranges of the second attribute distributed along the second axis of the rendered visualization; and the data processing circuit re-renders the rendered visualization with the data corresponding to the selected at least one data value range of the first set of data value ranges arranged in the second set of data value ranges distributed along the first axis and the data corresponding to the selected at least one data value range of the third set of data value ranges arranged in the fourth set of data value ranges distributed along the second axis.

28. A method for interactively visualizing data obtained from a data source, comprising:

creating a rendered visualization representative of the obtained data, comprising arranging at least a first attribute of the data relative to a first axis of the rendered visualization according to a first set of groupings;

displaying the rendered visualization of the obtained data;

inputting at least one of data and commands to select a subset of the obtained data represented by the rendered visualization; and re-rendering the rendered visualization of the obtained data based on the selected subset, comprising re-arranging at least the first attribute of the data relative to the first axis of the rendered visualization according to a second set of groupings such that the second set of groupings visualizes the selected subset in greater detail than the first set of groupings.

29. The method of claim 28, wherein inputting at least one of data and commands to select a subset of the obtained data represented by the rendered visualization comprises selecting the subset from the rendered visualization.

30. The method of claim 28, wherein inputting at least one of data and commands to select a subset of the obtained data represented by the rendered visualization comprises selecting a subset of the first set of groupings.

31. The method of claim 28, wherein arranging at least the first attribute of the data comprises arranging at least the first attribute of the data relative to the first axis of the rendered visualization such that each of the first set of groupings corresponds to an associated data value range of a first set of data value ranges of the first attribute distributed along the first axis of the rendered visualization.

32. The method of claim 31, wherein inputting at least one of data and commands to select a subset of the obtained data represented by the rendered visualization comprises selecting a subset of the first set of groupings.

33. The method of claim 32, wherein re-arranging at least the first attribute of the data according to the second set of groupings comprises associating a data value range of a second set of data value ranges to each of the second set of groupings such that the data value ranges associated with the at least one group of the second set of groupings corresponding to the selected subset visualizes the selected subset at a finer level of granularity than in the corresponding data value ranges of the first set of data value ranges.

34. The method of claim 28, wherein:

creating the rendered visualization representative of the obtained data further comprises arranging a second attribute of the data relative to a second axis of the rendered visualization according to a third set of groupings;

inputting at least one of data and commands to select the subset of the obtained data represented by the rendered visualization comprises selecting a subset of the first set of groupings and selecting a subset of the third set of groupings; and re-rendering the rendered visualization of the obtained data based on the selected subset comprises:

re-arranging at least the first attribute of the data relative to the first axis of the rendered visualization according to a second set of groupings such that the second set of groupings visualizes the selected subset distributed along the first axis in greater detail than the first set of groupings distributed along the first axis, and re-arranging at least the second attribute of the data relative to the second axis of the rendered visualization according to a fourth set of groupings such that the fourth set of groupings visualizes the selected subset distributed along the second axis in greater detail than the third set of groupings distributed along the second axis.

35. The method of claim 34, wherein:

arranging at least the first attribute of the data comprises arranging at least the first attribute of the data relative to the first axis of the rendered visualization such that each of the first set of groupings corresponds to an associated data value range of a first set of data value ranges of the first attribute distributed along the first axis of the rendered visualization; and arranging at least the second attribute of the data comprises arranging at least the second attribute of the data relative to the second axis of the rendered visualization such that each of the third set of groupings corresponds to an associated data value range of a third set of data value ranges of the second attribute distributed along the second axis of the rendered visualization.

36. The method of claim 35, wherein:

selecting the subset of the obtained data comprises selecting at least one grouping of the first set of groupings and at least one grouping of the third set of groupings using at least one of the at least one data input device; and re-arranging at least the first attribute of the data according to the second set of groupings comprises:

associating a second set of data value ranges with the second set of groupings such that the data value ranges associated with the at least one group of the second set of groupings corresponding to the selected subset distributed along the first axis visualizes the selected subset distributed along the first axis at a finer level of granularity than in the corresponding data value ranges of the first set of data value ranges, and associating a fourth set of data value ranges with the fourth set of groupings such that the data value ranges associated with the at least one group of the fourth set of groupings corresponding to the selected subset distributed along the second axis visualizes the selected subset distributed along the second axis at a finer level of granularity than in the corresponding data value ranges of the third set of data value ranges.

37. A method for interactively visualizing data obtained from a data source, comprising:

creating a rendered visualization representative of the obtained data, comprising arranging at least a first attribute of the obtained data relative to the first axis of the rendered visualization at a first level of granularity displaying the rendered visualization of the obtained data;

inputting at least one of data and commands to select a subset of the obtained data represented by the rendered visualization; and re-rendering the rendered visualization of the obtained data based on the selected subset of the obtained data to visualize the selected subset of the obtained data in greater detail, such that at least the selected subset of the data is arranged relative to the first axis of the rendered visualization at a second level of granularity, the second level of granularity visualizing the selected subset in greater detail than the first level of granularity.

38. The method of claim 37, wherein inputting at least one of data and commands to select a subset of the obtained data represented by the rendered visualization comprises selecting the subset from the rendered visualization.

39. The method of claim 37, wherein:

the first level of granularity corresponds to a first set of data value ranges of the first attribute distributed along the first axis of the rendered visualization; and inputting at least one of data and commands to select the subset of the obtained data represented by the rendered visualization comprises selecting at least one data value range of the first set of data value ranges.

40. The method of claim 37, wherein:

creating the rendered visualization representative of the obtained data comprises arranging at least the first attribute of the data relative to the first axis of the rendered visualization such that the first level of granularity corresponds to a first set of data value ranges of the first attribute distributed along the first axis of the rendered visualization; and re-rendering the rendered visualization of the obtained data based on the selected subset comprises re-arranging at least the first attribute of the data relative to the first axis of the rendered visualization such that the second level of granularity corresponds to a second set of data value ranges of the first attribute distributed along the first axis of the rendered visualization.

41. The method of claim 40, wherein:

inputting at least one of data and commands to select a subset of the obtained data represented by the rendered visualization comprises selecting at least one data value range of the first set of data value ranges; and re-arranging at least the first attribute of the data comprises re-arranging the data corresponding to the selected at least one data value range of the first set of data value ranges into the second set of data value ranges.

42. The method of claim 37, wherein:

arranging at least the first attribute of the obtained data relative to the first axis of the rendered visualization at the first level of granularity comprises:

arranging the first attribute of the obtained data relative to the first axis of the rendered visualization at the first level of granularity, and arranging a second attribute of the obtained data relative to a second axis of the rendered visualization at a third level of granularity; and inputting at least one of data and commands to select a subset of the obtained data represented by the rendered visualization comprises selecting a subset of the data distributed along the first and second axes; and re-rendering the rendered visualization of the obtained data based on the selected subset comprises re-arranging at least the first attribute of the data relative to the first axis of the rendered visualization, such that at least the selected subset of the data is arranged relative to the first axis of the rendered visualization at the second level of granularity and relative to the second axis of the rendered visualization at a fourth level of granularity, the fourth level of granularity visualizing the selected subset in greater detail than the third level of granularity.

43. The method of claim 42, wherein:

arranging the first attribute of the obtained data relative to the first axis of the rendered visualization at the first level of granularity comprises arranging the first attribute of the data relative to the first axis of the rendered visualization such that the first level of granularity corresponds to a first set of data value ranges of the first attribute distributed along the first axis of the rendered visualization, and arranging the second attribute of the obtained data relative to the second axis of the rendered visualization at the third level of granularity comprises arranging the second attribute of the data relative to the second axis of the rendered visualization such that the third level of granularity corresponds to a third set of data value ranges of the second attribute distributed along the second axis of the rendered visualization;

inputting at least one of data and commands to select the subset of the obtained data represented by the rendered visualization comprises selecting at least one data value range of the first set of data value ranges and at least one data value range of the third set of data value ranges; and re-rendering the rendered visualization of the obtained data based on the selected subset comprises:

re-arranging the first attribute of the data relative to the first axis of the rendered visualization such that the second level of granularity corresponds to a second set of data value ranges of the first attribute distributed along the first axis of the rendered visualization, and re-arranging the second attribute of the data relative to the second axis of the rendered visualization such that the fourth level of granularity corresponds to a fourth set of data value ranges of the first attribute distributed along the first axis of the rendered visualization.

44. The method of claim 43, wherein:

inputting at least one of data and commands to select a subset of the obtained data represented by the rendered visualization comprises selecting at least one data value range of the first set of data value ranges and at least one data value range of the third set of data value ranges;

re-arranging the first attribute of the data comprises re-arranging the data corresponding to the selected at least one data value range of the first set of data value ranges into the second set of data value ranges; and re-arranging the second attribute of the data comprises re-arranging the data corresponding to the selected at least one data value range of the third set of data value ranges into the fourth set of data value ranges.

* * * * *